(12) United States Patent
Kim et al.

(10) Patent No.: US 9,634,729 B2
(45) Date of Patent: Apr. 25, 2017

(54) DEMODULATOR FOR NEAR FIELD COMMUNICATION, NEAR FIELD COMMUNICATION DEVICE, AND ELECTRONIC DEVICE HAVING THE SAME

(71) Applicant: SAMSUNG ELECTRONICS CO., LTD., Suwon-si, Gyeonggi-do (KR)

(72) Inventors: Jun-Ho Kim, Yongin-si (KR); Young-Joo Lee, Yongin-si (KR); Jong-Pil Cho, Hwaseong-si (KR); Jin-Woo Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/184,314

(22) Filed: Jun. 16, 2016

(65) Prior Publication Data

US 2017/0019152 A1     Jan. 19, 2017

(30) Foreign Application Priority Data

Jul. 17, 2015   (KR) .......................... 10-2015-0101440

(51) Int. Cl.
| | | |
|---|---|---|
| *H04B 5/00* | (2006.01) | |
| *H04B 7/00* | (2006.01) | |
| *H04L 27/06* | (2006.01) | |
| *H04B 1/16* | (2006.01) | |

(52) U.S. Cl.
CPC ............. *H04B 5/0031* (2013.01); *H04B 1/16* (2013.01); *H04L 27/06* (2013.01)

(58) Field of Classification Search
CPC .. H04B 1/3827; H04B 5/0031; H04B 5/0037; H04M 1/6066; H04M 1/7253; H04W 4/008

USPC .......................... 455/41.1, 41.2, 552.1, 553.1
See application file for complete search history.

(56) References Cited

U.S. PATENT DOCUMENTS

| | | | |
|---|---|---|---|
| 8,188,787 B2 | 5/2012 | Wilson et al. | |
| 8,190,107 B1 | 5/2012 | Gilbert | |
| 8,436,718 B2* | 5/2013 | Goto .................... | G06K 7/0008 340/10.1 |

(Continued)

FOREIGN PATENT DOCUMENTS

| | | |
|---|---|---|
| JP | 06326628 A | 11/1994 |
| JP | 2012044249 B | 3/2012 |

(Continued)

*Primary Examiner* — Quochien B Vuong
(74) *Attorney, Agent, or Firm* — Volentine & Whitt, PLLC

(57) ABSTRACT

A demodulator for a near field communication (NFC) includes a first rectifier, a shifting rectifier, a field monitor and an edge detector. The first rectifier receives an antenna voltage through a first power terminal and a second power terminal, rectifies the antenna voltage and provides a first rectified signal to a first node. The shifting rectifier is enabled in response to an enable signal, receives the antenna voltage through the first power terminal and the second power terminal, increases a direct current (DC) level of the antenna voltage, rectifies the increased DC-level antenna voltage and provides a shifted rectified signal to the first node. The field monitor receives the antenna voltage through the first power terminal and the second power terminal, monitors a magnitude of the antenna voltage and generates the enable signal which is activated when the magnitude is smaller than a reference value.

20 Claims, 11 Drawing Sheets

(56) References Cited

U.S. PATENT DOCUMENTS

| | | | |
|---|---|---|---|
| 8,593,254 B2 | 11/2013 | Okuda | |
| 8,605,816 B2 | 12/2013 | Tsushima | |
| 8,630,584 B2 | 1/2014 | Yu et al. | |
| 9,035,603 B2 * | 5/2015 | Endo | H02J 7/025 |
| | | | 455/41.1 |
| 2015/0008755 A1 * | 1/2015 | Sone | H02J 7/025 |
| | | | 307/104 |
| 2015/0178525 A1 | 6/2015 | Lee et al. | |

FOREIGN PATENT DOCUMENTS

| | | |
|---|---|---|
| KR | 1199095 B | 11/2012 |
| KR | 1412866 B | 6/2014 |
| KR | 20140110389 A | 9/2014 |

* cited by examiner ue" id="US09634729-20170425-P00001" file="US09634729-20170425-P00001.TIF" wi="" he="" img-content="drawing" img-format="tif"/>

DEMODULATOR FOR NEAR FIELD COMMUNICATION, NEAR FIELD COMMUNICATION DEVICE, AND ELECTRONIC DEVICE HAVING THE SAME

CROSS-REFERENCE TO RELATED APPLICATION(S)

A claim for priority under 35 USC § 119 is made to Korean Patent Application No. 10-2015-0101440, filed on Jul. 17, 2015 in the Korean Intellectual Property Office (KIPO), the entire contents of which are hereby incorporated by reference.

BACKGROUND

The inventive concepts described herein relate to wireless communication technology, and more particularly to a demodulator for near field communication (NFC), a NFC device including the demodulator, and an electronic device including the NFC device.

Recently, as near field communication (NFC) technology, which is a wireless communication technology, has developed, NFC devices have been widely employed in mobile devices. As the size of mobile devices have decreased, it has become necessary to decrease the size of antennas included in NFC devices.

However, as the size of antennas included in NFC devices has decreased, a magnitude of antenna voltage generated at the antennas based on an electromagnetic wave has also decreased, such that communication distance of the NFC devices has decreased.

SUMMARY

Some example embodiments of the inventive concept are directed to provide a demodulator for a near field communication (NFC) that increases a communication distance.

Some example embodiments of the inventive concept are directed to provide an NFC device including the demodulator.

Some example embodiments of the inventive concept are directed to provide an electronic device including the NFC device.

According to example embodiments of the inventive concept, a demodulator for a near field communication (NFC) includes a first rectifier, a shifting rectifier, a field monitor and an edge detector. The first rectifier receives an antenna voltage through a first power terminal and a second power terminal, rectifies the antenna voltage and provides a first rectified signal to a first node. The shifting rectifier is enabled in response to an enable signal, receives the antenna voltage through the first power terminal and the second power terminal, increases a direct current (DC) level of the antenna voltage, rectifies the increased DC-level antenna voltage and provides a shifted rectified signal to the first node. The field monitor receives the antenna voltage through the first power terminal and the second power terminal, monitors a magnitude of the antenna voltage and generates the enable signal which is activated when the magnitude is smaller than a reference value.

In example embodiments, the antenna voltage may include a first antenna voltage and a second antenna voltage which have same magnitude and a phase difference of 180 degrees, the first antenna voltage may be received from outside through the first power terminal and the second antenna voltage may be received from the outside through the second power terminal.

The first rectifier may include a first diode connected between the first power terminal and the first node and a second diode connected between the second power terminal and the first node.

A threshold voltage of the first diode may be substantially the same as a threshold voltage of the second diode.

The shifting rectifier may include a first diode connected to the first node, a first source follower connected between the first power terminal and the first node, a second diode connected to the first diode and a second source follower connected between the second power terminal and the first node. The first source follower may increase a DC level of the first antenna voltage. The second source follower may increase a DC level of the second antenna voltage.

The first source follower may include a first current source and a first p-channel metal-oxide semiconductor (PMOS) transistor. The first current source may be connected between an internal power supply voltage and a second node connected to the first diode. The first PMOS transistor may be connected between the second node and a ground voltage and may have a gate that receives the first antenna voltage. The second source follower may include a second current source and a second PMOS transistor. The second current source may be connected between the internal power supply voltage and a third node connected to the second diode. The second PMOS transistor may be connected between the third node and the ground voltage, and may have a gate that receives the second antenna voltage.

A threshold voltage of the first PMOS transistor may be substantially the same as a threshold voltage of the second PMOS transistor. The first source follower may increase the DC level of the first antenna voltage substantially by the threshold voltage of the first PMOS transistor. The second source follower may increase the DC level of the second antenna voltage substantially by the threshold voltage of the second PMOS transistor.

The field monitor may include a second rectifier and a signal generator. The field monitor may receive the antenna voltage from the first power terminal and the second power terminal, may rectify the antenna voltage and may provide a second rectified signal to a second node. The signal generator may convert the second rectified signal to a corresponding first digital signal, may compare the first digital signal with the reference value and may selectively activate the enable signal based on the comparison of the first digital signal and the reference value.

The signal generator may include an analog-to-digital converter and a decision circuit. The analog-to-digital converter may convert the second rectified signal to the first digital signal. The decision circuit may store a second digital signal corresponding to the reference value therein, may compare the first digital signal with the second digital signal and may selectively activate the enable signal.

The second rectifier may include a first diode connected between the first power terminal and the second node and a second diode coupled between the second power terminal and the second node.

The field monitor may deactivate the enable signal when the magnitude of the antenna voltage is equal to or greater than the reference value and the shifting rectifier may be disabled in response to the deactivation of the enable signal. The field monitor may activate the enable signal when the magnitude of the antenna voltage is smaller the reference value and the shifting rectifier may be enabled in response to the activation of the enable signal and may provide the shifted rectified signal to the first node.

In example embodiments, the demodulator may further include a current source and a charge storing circuit. The current source may be connected between the first node and a ground voltage, and may generate a constant current flowing from the first node to the ground voltage. The charge storing circuit may be connected between the first node and the ground voltage, may perform a charging operation and a discharging operation alternately, based on the signal at the first node, and may output an envelope signal, which corresponds to an envelope of the scale down signal, through the first node. The edge detector may generate the input data based on a transition of the envelope signal.

According to example embodiments of the inventive concept, a near field communication (NFC) device includes a resonance circuit and an NFC chip. The resonance circuit generates an antenna voltage based on an electromagnetic wave received from an external device. The NFC chip communicates data with the external device based on the antenna voltage. The NFC chip includes a demodulator. The demodulator receives the antenna voltage from the resonance circuit, performs one of a first rectifying operation to directly rectify the antenna voltage and a second rectifying operation to rectify an increased DC-level antenna voltage after increasing the DC-level of the antenna voltage based on a magnitude of the antenna voltage, provides a rectified signal to a first node, and generates input data corresponding to the antenna voltage based on a signal at the first node.

In example embodiments, the demodulator may perform the first rectifying operation when the magnitude of the antenna voltage is equal to or greater than a reference value.

In example embodiments, the demodulator may perform the second rectifying operation when the magnitude of the antenna voltage is smaller than a reference value.

In example embodiments, the antenna voltage may include a first antenna voltage and a second antenna voltage which have a same magnitude and a phase difference of 180 degrees, the first antenna voltage may be received from outside through the first power terminal and the second antenna voltage may be received from the outside through the second power terminal.

In example embodiments, the demodulator may include a first rectifier, a shifting rectifier, a field monitor and an edge detector. The first rectifier may receive the antenna voltage through a first power terminal and a second power terminal, may rectify the antenna voltage and may provide a first rectified signal to the first node. The shifting rectifier may be enabled in response to an enable signal, may receive the antenna voltage through the first power terminal and the second power terminal, may increase a direct current (DC) level of the antenna voltage, may rectify the increased DC-level antenna voltage and may provide a shifted rectified signal to the first node. The field monitor may receive the antenna voltage through the first power terminal and the second power terminal, may monitor a magnitude of the antenna voltage and may generate the enable signal which is activated when the magnitude is smaller than a reference value.

According to example embodiments, an electronic device includes a near field communication (NFC) device, a memory device and an application processor. The NFC device communicates with an external device through NFC. The memory device stores input data. The application processor controls operations of the NFC device and the memory device. The NFC device includes a resonance circuit and an NFC chip. The resonance circuit generates an antenna voltage based on an electromagnetic wave received from the external device. The NFC chip communicates data with the external device based on the antenna voltage. The NFC chip includes a demodulator. The demodulator receives the antenna voltage from the resonance circuit, performs one of a first rectifying operation to directly rectify the antenna voltage and a second rectifying operation to rectify an increased DC-level antenna voltage after increasing the DC-level of the antenna voltage based on a magnitude of the antenna voltage, provides a rectified signal to a first node, and generates input data corresponding to the antenna voltage based on a signal at the first node.

In example embodiments, the resonance circuit may include an antenna connected between a second node and a third node, a first capacitor connected between the second node and the third node in parallel with the antenna, a second capacitor connected between the second node and the first power terminal and a third capacitor connected between the third node and the second power terminal.

Accordingly, the NFC device may increase communication coverage in the card mode.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Figure 1:
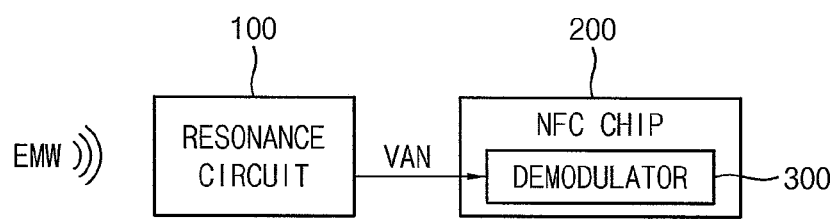
FIG. 1 is a block diagram illustrating a near field communication (NFC) device according to example embodiments of the inventive concept.

Various example embodiments of the inventive concept will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It should be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

FIG. 1 is a block diagram illustrating a near field communication (NFC) device according to example embodiments of the inventive concept.

The NFC device 10 illustrated in FIG. 1 communicates with an external device through an NFC scheme. In example embodiments of the inventive concepts, the NFC device 10 may be an NFC card or an NFC reader. In some example embodiments, the NFC device 10 may perform an operation of detecting whether an NFC card is near the NFC device 10 and an operation of detecting whether an NFC reader is near the NFC device 10 alternately.

When the NFC device 10 detects an NFC reader near the NFC device 10, the NFC device 10 may operate in a card mode, in which the NFC device 10 operates as a card. In the card mode, the NFC device 10 may communicate data with the NFC reader based on an electromagnetic wave EMW emitted from the NFC reader. When the NFC device 10 detects an NFC card near the NFC device 10, the NFC device 10 may operate in a reader mode, in which the NFC device 10 operates as a reader. In the reader mode, the NFC device 10 may emit an electromagnetic wave EMW to communicate data with the NFC card.

Referring to FIG. 1, the NFC device 10 includes a resonance circuit 100 and an NFC chip 200.

In the card mode, the resonance circuit 100 may communicate data with the NFC reader based on the electromagnetic wave EMW received from the NFC reader. Since the NFC reader includes a resonance circuit that includes an antenna having an inductance component and a resonance capacitor having a capacitance component, a mutual induction may occur between the resonance circuit 100 and the NFC reader, which is located near the resonance circuit 100, when the resonance circuit 100 receives the electromagnetic wave EMW from the NFC reader.

Therefore, an antenna voltage VAN may be generated by the resonance circuit 100 through the mutual induction with the NFC reader. The resonance circuit 100 may provide the antenna voltage VAN to the NFC chip 200.

The NFC chip 200 includes a demodulator 300 to perform a reception operation.

For example, the demodulator 300 may demodulate the antenna voltage VAN to generate input data.

The demodulator 300 may receive the antenna voltage VAN from the resonance circuit 100, and may perform one of a first rectifying operation and a second rectifying operation based on a magnitude of the antenna voltage VAN. The demodulator 300 may perform the first rectifying operation to directly rectify the antenna voltage VAN to provide a rectified signal to a first node when a magnitude of the antenna voltage VAN is equal to or greater than a reference value. The demodulator 300 may perform the second rectifying operation to rectify an increased DC-level antenna voltage after increasing the DC-level of the antenna voltage VAN to provide a shifted rectified signal to the first node, and may generate input data corresponding to the antenna voltage VAN based on a signal at the first node.

In the NFC scheme, an amplitude shift keying (ASK) modulation is used to communicate data. Therefore, the demodulator 300 may generate the input data corresponding to the antenna voltage VAN by detecting a transition of an envelope signal based on the signal at the first node. A structure and an operation of the demodulator 300 will be described later.

Figure 2:
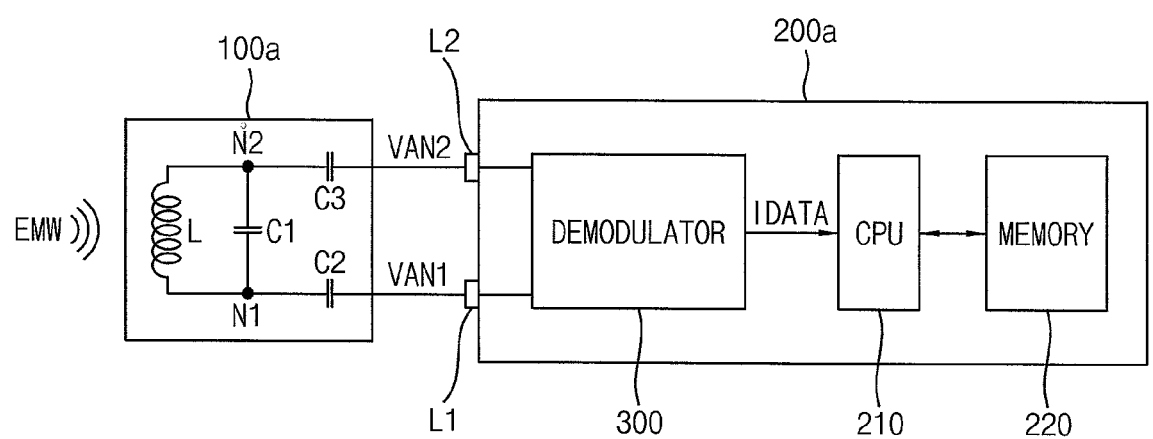
FIG. 2 is a block diagram illustrating an example of an NFC device of FIG. 1.

FIG. 2 is a block diagram illustrating an example of an NFC device of FIG. 1.

Referring to FIG. 2, an NFC device 10a includes a resonance circuit 100a and an NFC chip 200a.

The NFC chip 200a may be connected to the resonance circuit 100a through a first power terminal L1 and a second power terminal L2.

The resonance circuit 100a includes an antenna L, a first capacitor C1, a second capacitor C2 and a third capacitor C3. The antenna L and the first capacitor C1 are coupled in parallel between a first node N1 and a second node N2.

The antenna L and the first capacitor C1 may have a resonance frequency. In some example embodiments, the resonance frequency of the antenna L and the first capacitor C1 may be about 13.56 MHz. The second capacitor C2 is coupled between the first node N1 and the first power terminal L1. The third capacitor C3 is coupled between the second node N2 and the second power terminal L2.

When the resonance circuit 100a receives an electromagnetic wave EMW, which has a frequency corresponding to the resonance frequency, from an external NFC reader, mutual induction may occur between the resonance circuit 100a and the external NFC reader. Therefore, an induced voltage may be generated at the first node N1 and the second node N2, which correspond to both ends of the antenna L.

The induced voltage generated at the first node N1 may be provided to the first power terminal L1 through the second capacitor C2 as a first antenna voltage VAN1. The induced voltage generated at the second node N2 may be provided to the second power terminal L2 through the third capacitor C3 as a second antenna voltage VAN2.

Figure 3:
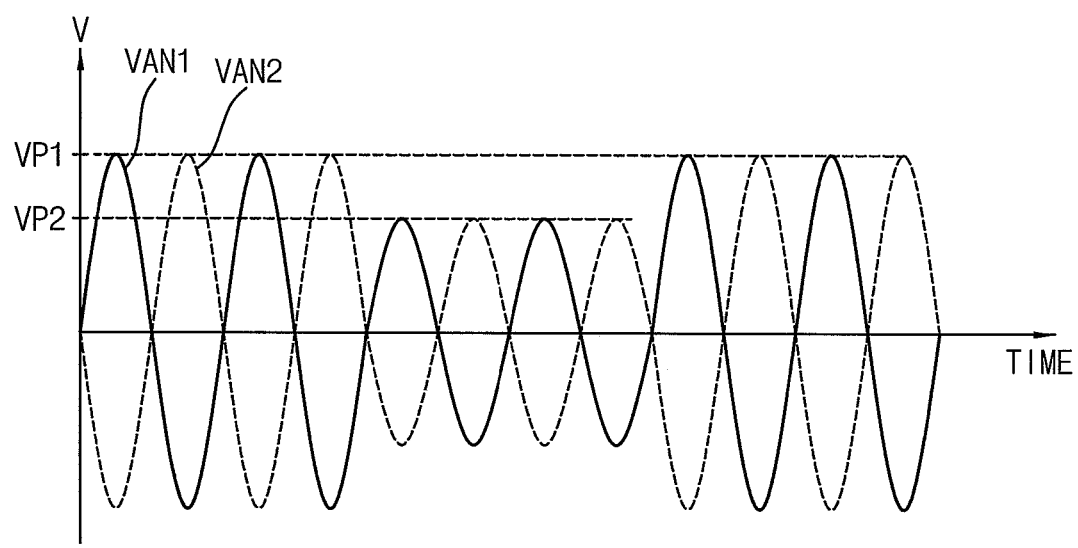
FIG. 3 is a graph illustrating a first antenna voltage and a second antenna voltage generated by a resonance circuit included in an NFC device of FIG. 2.

FIG. 3 is a graph illustrating a first antenna voltage and a second antenna voltage generated by a resonance circuit included in an NFC device of FIG. 2.

As described above, the induced voltage may be generated at the first node N1 and the second node N2 by mutual induction between the resonance circuit 100a and the external NFC reader. Therefore, a magnitude of the induced voltage generated at the first node N1 may be the same as a magnitude of the induced voltage generated at the second node N2, and a phase of the induced voltage generated at the first node N1 may be different from a phase of the induced voltage generated at the second node N2 by 180 degrees.

Since the second capacitor C2 eliminates most of a DC (direct current) component of the induced voltage generated at the first node N1, the first antenna voltage VAN1 provided to the first power terminal L1 may include an AC (alternating current) component and a slight DC component.

Similarly, since the third capacitor C3 eliminates most of a DC component of the induced voltage generated at the second node N2, the second antenna voltage VAN2 provided to the second power terminal L2 may include AC component and a slight DC component.

Therefore, as illustrated in FIG. 3, a magnitude of the first antenna voltage VAN1 may be the same as a magnitude of the second antenna voltage VAN2, and a phase of the first antenna voltage VAN1 may be different from a phase of the second antenna voltage VAN2 by 180 degrees. In FIG. 3, a solid line graph represents the first antenna voltage VAN1, and a dotted line graph represents the second antenna voltage VAN2.

Since an amplitude shift keying (ASK) modulation is used to communicate data in the NFC scheme, the first antenna voltage VAN1 and the second antenna voltage VAN2 may have a first peak voltage VP1 and a second peak voltage VP2 based on modulated data.

As a distance between the NFC device 10a and the external NFC reader increases, the first peak voltage VP1 and the second peak voltage VP2, which represent a magnitude of the first antenna voltage VAN1 and the second antenna voltage VAN2, may decrease. Alternately, as a distance between the NFC device 10a and the external NFC reader decreases, the first peak voltage VP1 and the second peak voltage VP2, which represent a magnitude of the first antenna voltage VAN1 and the second antenna voltage VAN2, may increase.

In addition, as the size of the antenna L included in the resonance circuit 100a is decreased, the first peak voltage VP1 and the second peak voltage VP2, which represent a magnitude of the first antenna voltage VAN1 and the second antenna voltage VAN2, may decrease. Alternately, as a size of the antenna L included in the resonance circuit 100a is increased, the first peak voltage VP1 and the second peak voltage VP2, which represent a magnitude of the first antenna voltage VAN1 and the second antenna voltage VAN2, may increase.

Referring again to FIG. 2, the NFC chip 200a includes a demodulator 300, a central processing unit (CPU) 210 and a memory 220.

The demodulator 300 may receive the first antenna voltage VAN1 through the first power terminal L1, and receive the second antenna voltage VAN2 through the second power terminal L2. The demodulator 300 may generate input data IDATA by demodulating the first antenna voltage VAN1 and the second antenna voltage VAN2, and provide the input data IDATA to the CPU 210. The CPU 210 may store the input data IDATA in the memory 220.

Figure 4:
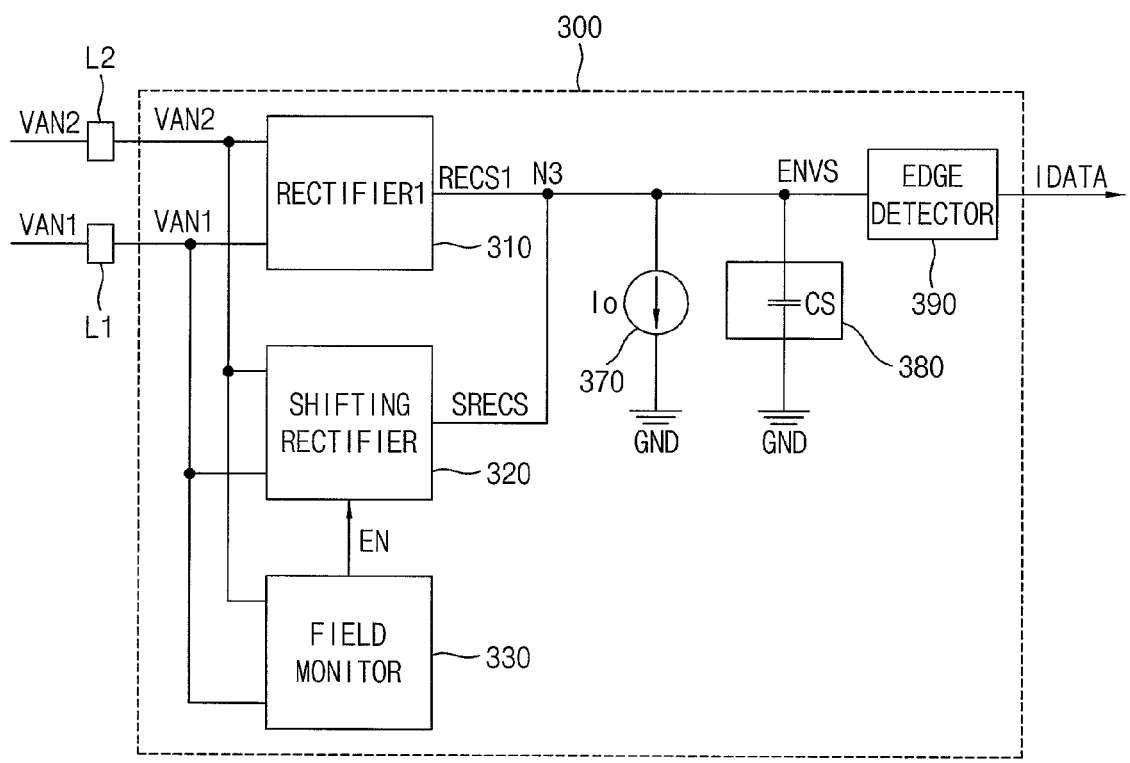
FIG. 4 is a block diagram illustrating an example of a demodulator included in an NFC device of FIG. 2.

FIG. 4 is a block diagram illustrating an example of a demodulator included in an NFC device of FIG. 2.

Referring to FIG. 4, the demodulator 300 includes a first rectifier 310, a shifting rectifier 320, a field monitor 330, a current source 370, a charge storing circuit 380 and an edge detector 390.

The first rectifier 310 may receive the first antenna voltage VAN1 through the first power terminal L1 and may receive the second antenna voltage VAN2 through the second power terminal L2. The first rectifier 310 may rectify the first antenna voltage VAN1 and the second antenna voltage VAN2 to provide a first rectified signal RECS1 to a third node N3. The first rectifier 310 may include diodes, and the first rectifier 310 may provide the first rectified signal RECS1 to the third node N3 when each magnitude of the first antenna voltage VAN1 and the second antenna voltage VAN2 is equal to or greater than each threshold voltage of the diodes.

The shifting rectifier 320 may receive the first antenna voltage VAN1 through the first power terminal L1 and may receive the second antenna voltage VAN2 through the second power terminal L2. The shifting rectifier 320 may receive an enable signal EN from the field monitor 330. The shifting rectifier 320 may be enabled in response to an activation of the enable signal EN, may increase a direct current (DC) level of the first antenna voltage VAN1 and the second antenna voltage VAN2, may rectify the increased DC-level first and second antenna voltages VAN1 and VAN2, and may provide a shifted rectified signal SRECS to the third node N3.

The field monitor 330 may receive the first antenna voltage VAN1 through the first power terminal L1 and may receive the second antenna voltage VAN2 through the second power terminal L2. The field monitor 330 may compare each magnitude of the first antenna voltage VAN1 and the second antenna voltage VAN2 with a reference value and may selectively activate the enable signal EN based on a result of the comparison of each magnitude of the first antenna voltage VAN1 and the second antenna voltage VAN2 with the reference value.

When each magnitude of the first antenna voltage VAN1 and the second antenna voltage VAN2 is equal to or greater than the reference value, the field monitor 330 may deactivate the enable signal EN. The shifting rectifier 320 may be disabled in response to a deactivation of the enable signal EN. When each magnitude of the first antenna voltage VAN1 and the second antenna voltage VAN2 is smaller than the reference value, the field monitor 330 may activate the enable signal EN. The shifting rectifier 320 may be enabled in response to the activation of the enable signal EN, may increase a direct current (DC) level of the first antenna voltage VAN1 and the second antenna voltage VAN2, may rectify the increased DC-level first and second antenna voltages VAN1 and VAN2, and may provide a shifted rectified signal SRECS to the third node N3.

The current source 370 may be connected between the third node N3 and the ground voltage GND. The current source 370 may generate a constant current Io flowing from the third node N3 to the ground voltage GND.

The charge storing circuit 380 may be connected between the third node N3 and the ground voltage GND. The charge storing circuit 380 may perform a charging operation and a discharging operation alternately based on a signal at the third node N3, one of the first rectified signal RECS 1 and the shifted rectified signal SRECS, to output an envelope signal ENVS, which corresponds to an envelope of one of the first rectified signal RECS1 and the shifted rectified signal SRECS, through the third node N3. The charge storing circuit 380 includes a storage capacitor CS connected between the third node N3 and the ground voltage GND.

The edge detector 390 may generate the input data IDATA, which correspond to the first antenna voltage VAN1 and the second antenna voltage VAN2, based on a transition of the envelope signal ENVS.

Figure 5:
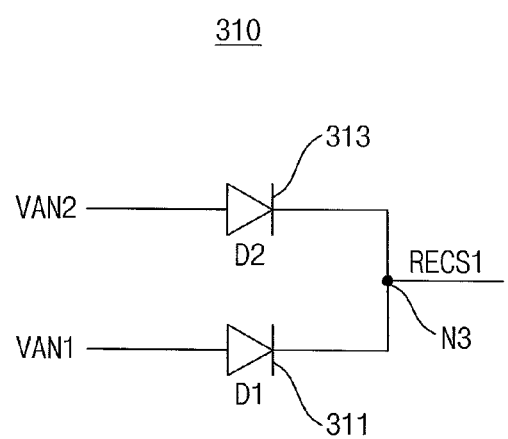
FIG. 5 is a circuit diagram illustrating an example of the first rectifier in the demodulator in FIG. 4.

FIG. 5 is a circuit diagram illustrating an example of the first rectifier in the demodulator in FIG. 4.

Referring to FIG. 5, the first rectifier 310 includes a first diode 311 and a second diode 313.

The first diode 311 is connected between the first power terminal L1 and the third node N3. The second diode 313 is connected between the second power terminal L2 and the third node N3. In example embodiments, a threshold voltage of the first diode 311 may be substantially same as a threshold voltage of the second diode 313. The first diode 311 may be turned on and the second diode 313 may be turned off during an interval in which each peak value of the first antenna voltage VAN1 and the second antenna voltage VAN2 is respectively equal to or greater than each threshold voltage of the first diode 311 and the second diode 313, the first antenna voltage VAN1 has a positive voltage and the second antenna voltage VAN2 has a negative voltage. Therefore, the first diode 311 may rectify the first antenna voltage VAN1 to provide the third node N3 with a voltage lower than the first antenna voltage VAN1 by the threshold voltage of the first diode 311 as the first rectified signal RECS1.

Similarly, the first diode 311 may be turned off and the second diode 313 may be turned on during an interval in which the first antenna voltage VAN1 has a negative voltage and the second antenna voltage VAN2 has a positive voltage. Therefore, the second diode 313 may rectify the second antenna voltage VAN2 to provide the third node N3 with a voltage lower than the second antenna voltage VAN2 by the threshold voltage of the second diode 313 as the first rectified signal RECS1.

Figure 6:
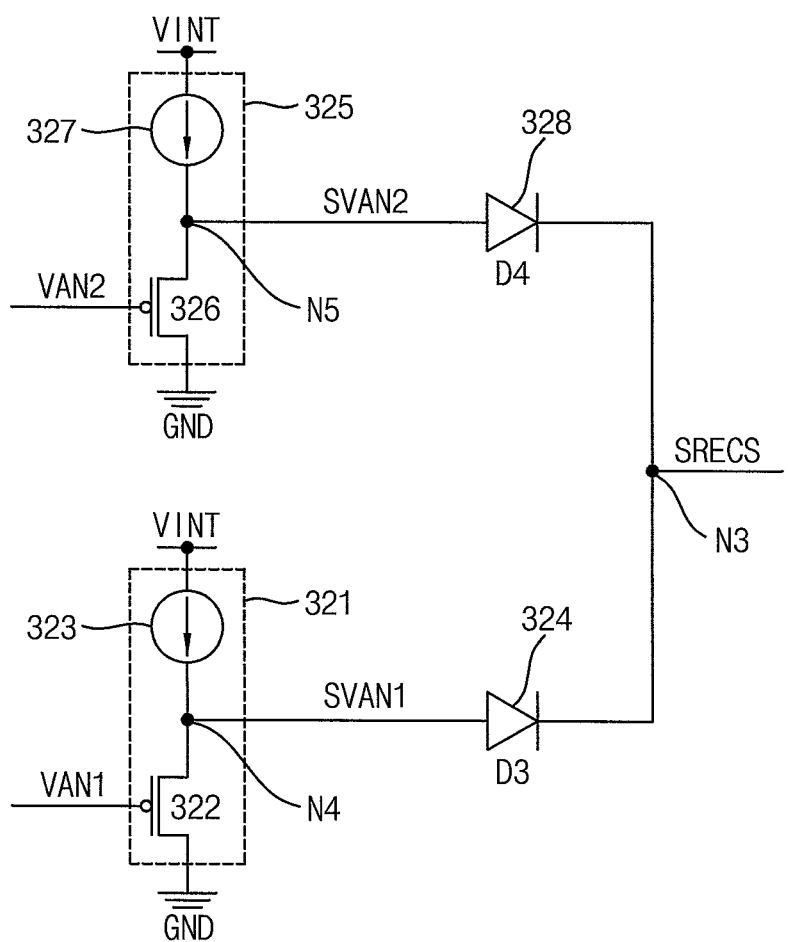
FIG. 6 is a circuit diagram illustrating an example of the shifting rectifier in the demodulator in FIG. 4 according to example embodiments of the inventive concept.

FIG. 6 is a circuit diagram illustrating an example of the shifting rectifier in the demodulator in FIG. 4 according to example embodiments of the inventive concept.

Referring to FIG. 6, the shifting rectifier 320 includes a first source follower 321, a third diode 324, a second source follower 365 and a fourth diode 328.

The third diode 324 is connected between the third node N3 and the first source follower 321. The first source follower 321 is connected to the first power terminal L1, an internal power supply voltage VINT and the ground voltage GND, and includes a first p-channel metal oxide semiconductor (PMOS) transistor 322 and a first current source 323. The first PMOS transistor 322 has a source connected to a fourth node N4, a drain connected to the ground voltage GND and a gate receiving the first antenna voltage VAN1. The first current source 323 is connected between the internal power supply voltage VINT and the first PMOS transistor 322. The first current source 323 is connected to the first PMOS transistor 322 at the fourth node N4.

The fourth diode 324 is connected between the third node N3 and the second source follower 325. The second source follower 325 is connected to the second power terminal L2, the internal power supply voltage VINT and the ground voltage GND, and includes a second PMOS transistor 326 and a second current source 327. The second PMOS transistor 326 has a source connected to a fifth node N5, a drain connected to the ground voltage GND and a gate receiving the second antenna voltage VAN2. The second current source 327 is connected between the internal power supply voltage VINT and the second PMOS transistor 326. The second current source 327 is connected to the second PMOS transistor 326 at the fifth node N5.

When the first antenna voltage VAN1 is applied to the gate of the first PMOS transistor 322, a first shifted antenna voltage SVAN1, which has a higher DC level than the first antenna voltage VAN1 by the threshold voltage of the first PMOS transistor 322, is induced at the fourth node N4, i.e., source of the first PMOS transistor 322, the third diode 324 rectifies the first shifted antenna voltage SVAN1 to provide the shifted rectified signal SRECS to the third node N3. When the second antenna voltage VAN2 is applied to the gate of the second PMOS transistor 326, a second shifted antenna voltage SVAN2, which has a higher DC level than the second antenna voltage VAN2 by the threshold voltage of the second PMOS transistor 326, is induced at the fifth node N5, i.e., source of the second PMOS transistor 326, the fourth diode 328 rectifies the second shifted antenna voltage SVAN2 to provide the shifted rectified signal SRECS to the third node N3.

The threshold voltage of the first PMOS transistor 322 may be substantially same as the threshold voltage of the second PMOS transistor 326, and a threshold voltage of the third diode 324 may be substantially same as a threshold voltage of the fourth diode 328.

The shifting rectifier 320 of FIG. 6 increases each DC level of the first antenna voltage VAN1 and the second antenna voltage VAN2 by each threshold voltage of the first PMOS transistor 322 and the second PMOS transistor 326 respectively and rectifies the first shifted antenna voltage SVAN1 and the second shifted antenna voltage SVAN2 using the third diode 324 and the fourth diode 328 respectively. Therefore, the shifting rectifier 320 may provide the shifted rectified signal SRECS to the third node N3, when each level of the first antenna voltage VAN1 and the second antenna voltage VAN2 is smaller than each threshold voltage of the third diode 324 and the fourth diode 328, respectively.

Figure 7:
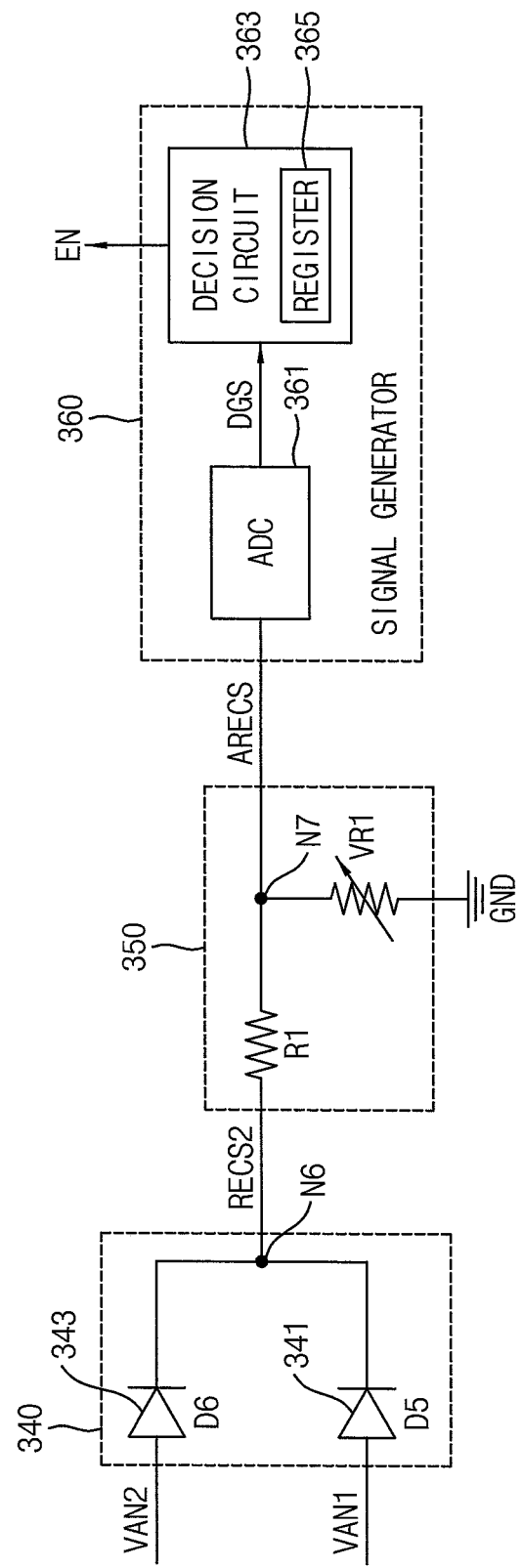
FIG. 7 is a circuit diagram illustrating an example of the field monitor in the demodulator in FIG. 4 according to example embodiments of the inventive concept.

FIG. 7 is a circuit diagram illustrating an example of the field monitor in the demodulator in FIG. 4 according to example embodiments of the inventive concept.

Referring to FIG. 7, the field monitor 330 includes a second rectifier 340 and a signal generator 360. In example embodiments, the field monitor 330 may further include an attenuator 350 connected between the second rectifier 340 and the signal generator 360.

The second rectifier 340 includes a fifth diode 341 and a sixth diode 343.

The fifth diode 341 is connected between the first power terminal L1 and the sixth node N6. The sixth diode 343 is connected between the second power terminal L2 and the sixth node N6. In example embodiments, a threshold voltage of the fifth diode 341 may be substantially same as a threshold voltage of the sixth diode 343. The fifth diode 341 may be turned on and the sixth diode 343 may be turned off during an interval in which each peak value of the first antenna voltage VAN1 and the second antenna voltage VAN2 is respectively equal to or greater than each threshold voltage of the fifth diode 341 and the sixth diode 343, the first antenna voltage VAN1 has a positive voltage and the second antenna voltage VAN2 has a negative voltage. Therefore, the fifth diode 341 may rectify the first antenna voltage VAN1 to provide the sixth node N6 with a voltage lower than the first antenna voltage VAN1 by the threshold voltage of the fifth diode 341 as the second rectified signal RECS2.

Similarly, the fifth diode 341 may be turned off and the sixth diode 343 may be turned on during an interval in which the first antenna voltage VAN1 has a negative voltage and the second antenna voltage VAN2 has a positive voltage. Therefore, the sixth diode 343 may rectify the second antenna voltage VAN2 to provide the sixth node N6 with a voltage lower than the second antenna voltage VAN2 by the threshold voltage of the sixth diode 343 as the second rectified signal RECS2.

The attenuator 350 includes a resistor R1 and a variable resistor VR1. The resistor R1 is connected between the sixth node N6 and a seventh node N7, and the variable resistor VR1 is connected between the seventh node N7 and the ground voltage GND. The attenuator 350 may operate as a voltage divider which divides the second rectified signal RECS2 by a predetermined ratio to provide an attenuated rectified signal ARECS to the signal generator 360. In some embodiments of the inventive concept, the field monitor 330 may not include the attenuator 350. When the attenuator 350 is not included in the field monitor 330, the signal generator 360 may receive the second rectified signal RECS2 and may generate the enable signal EN based on the second rectified signal RECS2.

The signal generator 360 may convert the second rectified signal RECS2 or the attenuated rectified signal ARECS to a corresponding first digital signal, may compare the first digital signal with a reference value and may selectively activate the enable signal EN based on a result of comparison of the first digital signal and the reference value.

The signal generator 360 includes an analog-to-digital converter 361 and a decision circuit 363. The decision circuit 363 includes a register 365 that stores a second digital signal corresponding to the reference value.

The analog-to-digital converter 361 converts the second rectified signal RECS2 or the attenuated rectified signal ARECS to a first digital signal DGS and provides the first digital signal DGS to the decision circuit 363. The decision circuit 363 digitally compares the first digital signal DGC with the second digital signal stored in the register 365 and selectively activates the enable signal EN based on the result of comparison of the first digital signal DGS and the second digital signal. The decision circuit 363 may include a digital comparator that performs the digital comparison. The first digital signal DGS and the second digital signal may include a single bit or a plurality of bits.

When a distance between the external NFC reader and the NFC device 10 is sufficiently near such that the magnitude of the antenna voltage is equal to or greater than the threshold voltage of the first rectifier 310, the first digital signal DGS corresponding to the second rectified signal RECS2 and the attenuated rectified signal ARECS is equal to or greater than the second digital signal. In this case, the decision circuit 363 deactivates the enable signal EN, and the shifting rectifier 320 may be disabled in response to deactivation of the enable signal EN.

When a distance between the external NFC reader and the NFC device 10 is far such that the magnitude of the antenna voltage is smaller than the threshold voltage of the first rectifier 310, the first digital signal DGS corresponding to the second rectified signal RECS2 and the attenuated rectified signal ARECS is smaller than the second digital signal. In this case, the decision circuit 363 activates the enable signal EN, the shifting rectifier 320 may be enabled in response to activation of the enable signal EN, and the shifting rectifier 320 may provide the shifted rectified signal SRECS to the third node N3.

Figure 8:
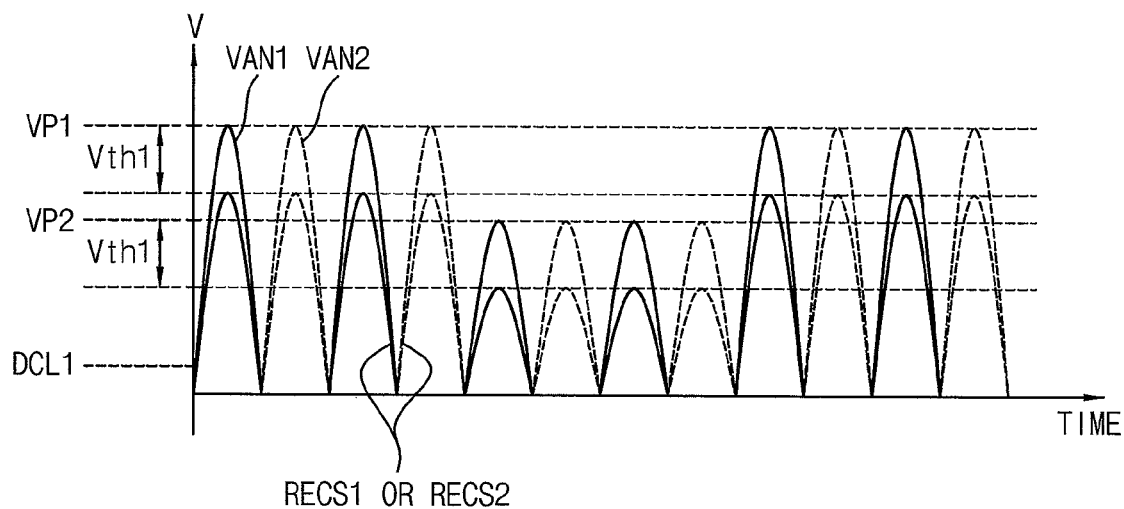
FIG. 8 is a graph illustrating the first rectified signal generated by the first rectifier of FIG. 5.

FIG. 8 is a graph illustrating the first rectified signal generated by the first rectifier of FIG. 5.

In FIG. 8, the first rectified signal RECS1 generated by the first rectifier 310 is illustrated in a case that the magnitude of the first antenna voltage VAN1 and the second antenna voltage VAN2 is greater than the threshold voltage Vth1 of the first diode 311 and the second diode 313.

Referring to FIGS. 5 to 8, the first diode 311 may be turned on and the second diode 313 may be turned off during an interval in which the first antenna voltage VAN1 has a positive voltage and the second antenna voltage VAN2 has a negative voltage. Therefore, as illustrated in FIG. 8, the first rectifier 310 may provide a voltage, which is lower than the first antenna voltage VAN1 by the threshold voltage Vth1 of the first diode 311, to the third node N3 as the first rectified signal RECS.

Similarly, the first diode 311 may be turned off and the second diode 313 may be turned on during an interval in which the first antenna voltage VAN1 has a negative voltage and the second antenna voltage VAN2 has a positive voltage. Therefore, as illustrated in FIG. 8, the first rectifier 310 may provide a voltage, which is lower than the second antenna voltage by the threshold voltage Vth1 of the second diode 313, to the third node N3 as the first rectified signal RECS1. The first antenna voltage VAN1 and the second antenna voltage VAN2 may have a first DC level DCL1.

As described above, when a first peak voltage VP1 and a second peak voltage VP2 of the first antenna voltage VAN1 and the second antenna voltage VAN2 are higher than the threshold voltage Vth1 of the first diode 311 and the second diode 313, the first rectified signal RECS1 generated by the first rectifier 310 may correspond to a signal that is lower than the first antenna voltage VAN1 and the second antenna voltage VAN2 by the threshold voltage Vth1 of the first diode 311 and the second diode 313.

The second rectified signal RECS2 generated by the second rectifier 340 in FIG. 7 may be substantially same as the first rectified signal RECS1.

Figure 9:
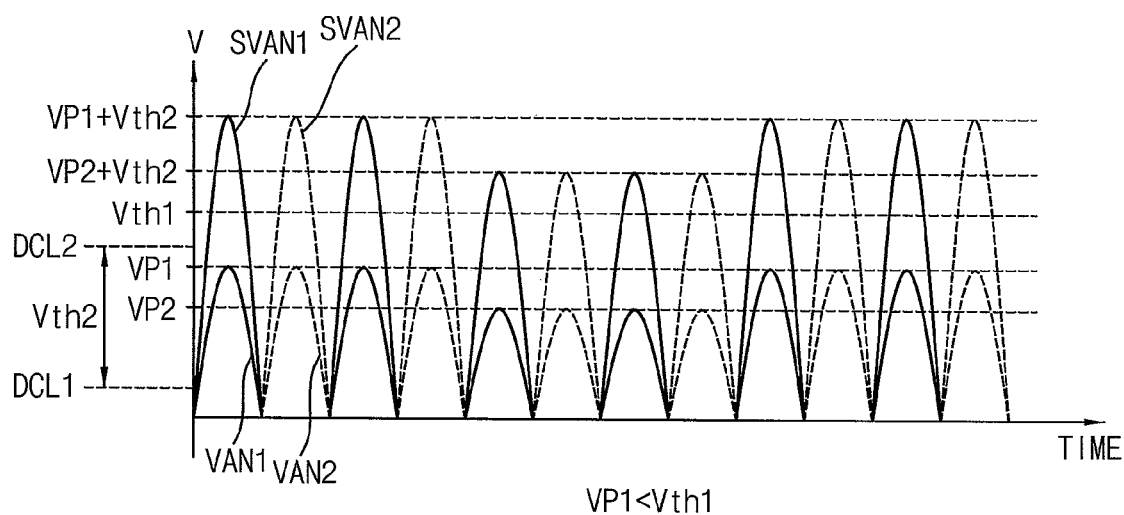
FIG. 9 is a graph illustrating the shifted antenna voltage generated by the shifting rectifier of FIG. 6.
Figure 10:
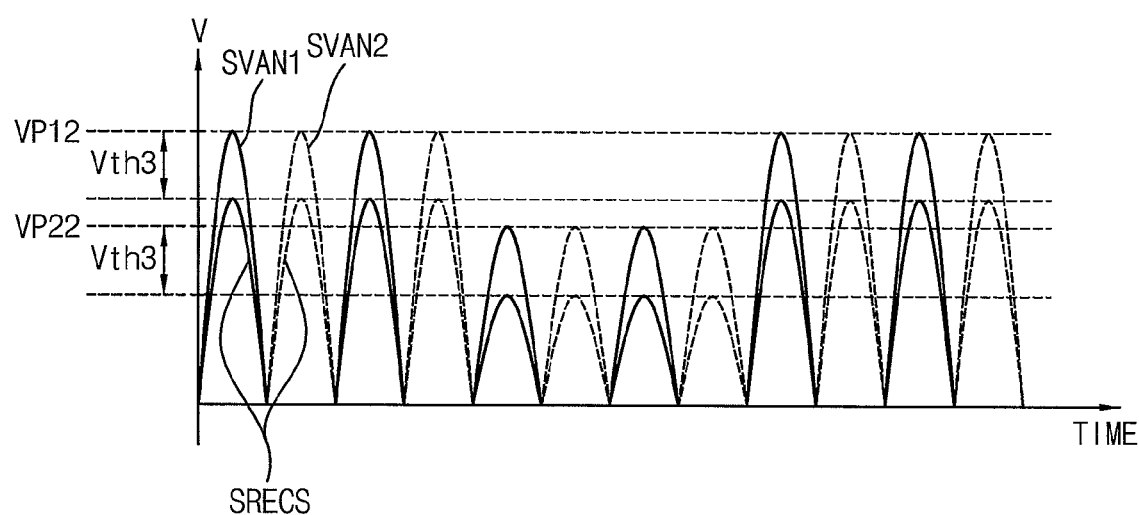
FIG. 10 is a graph illustrating the shifted rectified signal generated by the shifting rectifier of FIG. 6.

FIG. 9 is a graph illustrating the shifted antenna voltage generated by the shifting rectifier of FIG. 6, and FIG. 10 is a graph illustrating the shifted rectified signal generated by the shifting rectifier of FIG. 6.

FIGS. 9 and 10 illustrate a case that the magnitude of the peak voltage VP1 of the first antenna voltage VAN1 and the peak voltage VP2 of the second antenna voltage VAN2 is smaller than the threshold voltage Vth1 of the first diode 311 and the second diode 313.

Referring to FIGS. 6, 9 and 10, there is provided, at the fourth node N4, the first shifted antenna voltage SVAN1, which is higher than the DC level of the first antenna voltage VAN1 by the threshold voltage Vth2 of the first PMOS transistor 322, by the first source follower 321, and there is provided, at the fifth node N5, the second shifted antenna voltage SVAN2, which is higher than the DC level of the second antenna voltage VAN2 by the threshold voltage Vth2 of the second PMOS transistor 326, by the second source follower 325. The first shifted antenna voltage SVAN1 and the second shifted antenna voltage SVAN2 may have a second DC level DCL2 which is higher than the first DC level DCL1 by the threshold voltage Vth2.

In addition, the third diode 324 may be turned on and the fourth diode 328 may be turned off during an interval in which the first shifted antenna voltage SVAN1 has a positive voltage and the second shifted antenna voltage SVAN2 has a negative voltage. Therefore, third diode 324 may provide a voltage, which is lower than the first shifted antenna voltage SVAN1 by the threshold voltage Vth3 of the third diode 324, to the third node N3 as the shifted rectified signal SRECS.

Similarly, the third diode 324 may be turned off and the fourth diode 328 may be turned on during an interval in which the first shifted antenna voltage SVAN1 has a negative voltage and the second shifted antenna voltage SVAN2 has a positive voltage. Therefore, fourth diode 328 may provide a voltage, which is lower than the second shifted antenna voltage SVAN2 by the threshold voltage Vth3 of the fourth diode 328, to the third node N3 as the shifted rectified signal SRECS. The shifted antenna voltages SVAN1 and SVAN2 may have peak voltages VP12 and VP22, respectively. The peak voltage VP12 may correspond to a sum of the peak voltage VP1 and the threshold voltage Vth2, and the peak voltage VP22 may correspond to a sum of the peak voltage VP2 and the threshold voltage Vth2.

Figure 11:
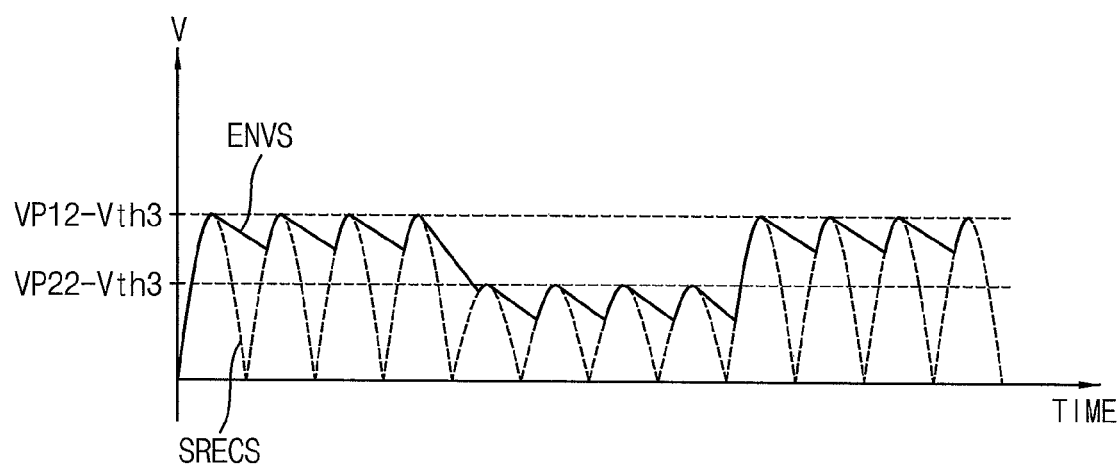
FIG. 11 is a graph illustrating an envelope signal generated by the demodulator of FIG. 4.

FIG. 11 is a graph illustrating an envelope signal generated by the demodulator of FIG. 4.

Referring to FIGS. 4 to 11, when a voltage of the shifted voltage signal SRECS increases, the storage capacitor CS may be charged based on the shifted voltage signal SRECS. Therefore, the voltage at the third node N3 may increase along the increase of the shifted voltage signal SRECS. When a voltage of the shifted voltage signal SRECS decreases, the storage capacitor CS may be slowly discharged based on the constant current Io. Therefore, the voltage at the third node N3 may not decrease along the decrease of the shifted voltage signal SRECS but decrease slowly. As a capacitance of the storage capacitor CS increases, a decrease rate of the voltage at the third node N3 may decrease.

When the voltage at the third node N3 becomes same as the voltage of the shifted voltage signal SRECS while the voltage at the third node N3 decreases slowly, the voltage at the third node N3 may increase along the increase of the shifted voltage signal SRECS. Therefore, as illustrated in FIG. 11, the envelope signal ENVS, which corresponds to the voltage at the third node N3, may represent an envelope of the shifted voltage signal SRECS.

In a general NFC device, an antenna voltage generated by a resonance circuit is rectified by a rectifier, and then an envelope signal is generated based on the rectified signal. Therefore, a magnitude of the envelope signal may be lower than a magnitude of the antenna voltage by a threshold voltage of the rectifier. As such, the general NFC device may be able to demodulate the antenna voltage to generate input data only when the magnitude of the antenna voltage is higher than a sum of a threshold voltage of the rectifier and a threshold voltage of an edge detector. That is, the general NFC device may not be able to demodulate the antenna voltage because the output of the rectifier is substantially zero when the magnitude of the antenna voltage is lower than the threshold voltage of the rectifier.

On the other hand, as described above with reference to FIGS. 1 to 11, the demodulator 300 includes a first path from the first rectifier 310 to the third node N3, a second path from the shifting rectifier 320 to the third node N3 and the field monitor 330 which selectively activates the second path according to the magnitude of the first antenna voltage VAN1 and the second antenna voltage VAN2. In the first path, the first antenna voltage VAN1 and the second antenna voltage VAN2 are directly rectified and in the second path, the first antenna voltage VAN1 and the second antenna voltage VAN2 are rectified after the DC level of the first antenna voltage VAN1 and the second antenna voltage VAN2 are increased.

Therefore, in the demodulator 300 according to example embodiments, the first rectifier 310 provides the first rectified signal RECS 1 to the third node N3 when the magnitude of the antenna voltage VAN is equal to or greater than the threshold voltage of the first rectifier 310, and the shifting rectifier 320 is enabled to provide the shifted rectified signal SRECS to the third node N3 when the magnitude of the antenna voltage VAN is smaller than the threshold voltage of the first rectifier 310. The demodulator 300 normally demodulates the antenna voltage and the NFC device 10 receives data correctly from the external NFC reader even in the case that a communication distance of the NFC device 10 is decreased due to a reduction of size of the antenna of the NFC device 10. Since the NFC device 10 receives data correctly even in the case that the antenna voltage VAN generated by the resonance circuit 100 is relatively low, a communication distance of the NFC device 10 may be effectively increased.

In addition, since the NFC device 10 generates the first rectified signal RECS 1 or the shifted rectified signal SRECS according to the magnitude of the first antenna voltage VAN1 and the second antenna voltage VAN2, and generates the input data IDATA by detecting the transition of the voltage level of the envelope signal ENVS, which corresponds to the envelope of the first shifted signal RECS1 or the shifted rectified signal SRECS, the NFC device 10 may be used regardless of the NFC transmission protocol. That is, the NFC device 10 may be used in any of the NFC transmission protocols including Type A, Type B and Type F.

Figure 12:
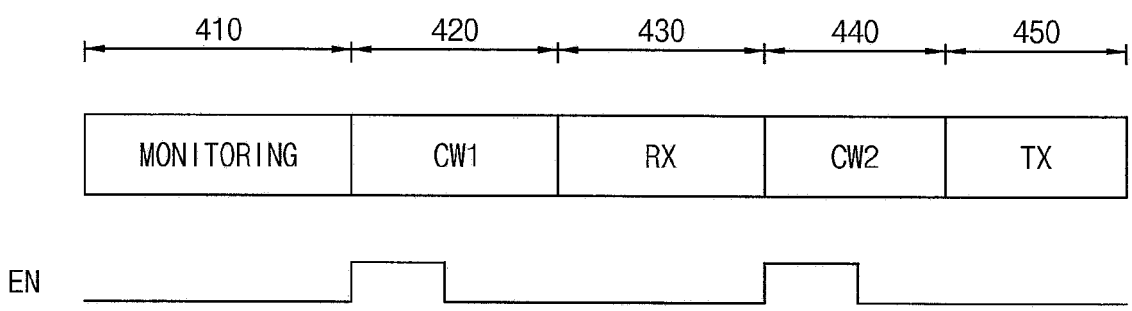
FIG. 12 illustrates operation of the NFC device of FIG. 1.

FIG. 12 illustrates operation of the NFC device of FIG. 1.

Referring to FIG. 12, the NFC device 10 may monitor whether an NFC reader is near the NFC device during a monitoring period 410. The NFC device 10 may receive a carrier wave CW1 that does not include data from the NFC reader during a carrier wave period 420. The NFC device 10 may receive data from the NFC reader during a data reception period 430 successive to the carrier wave period 420. The NFC device 10 may transmit a carrier wave CW2 to the NFC reader through a load modulation during a carrier wave period 440 successive to the data reception period 430. The NFC device 10 may transmit data to the NFC reader during a data transmission period 450 successive to the carrier wave period 440. The field monitor 330 may selectively activate the enable signal EN according to the magnitude of the antenna voltage VAN and may provide the activated enable signal EN to the shifting rectifier 320 during each of the carrier wave periods 420 and 440.

Figure 13:
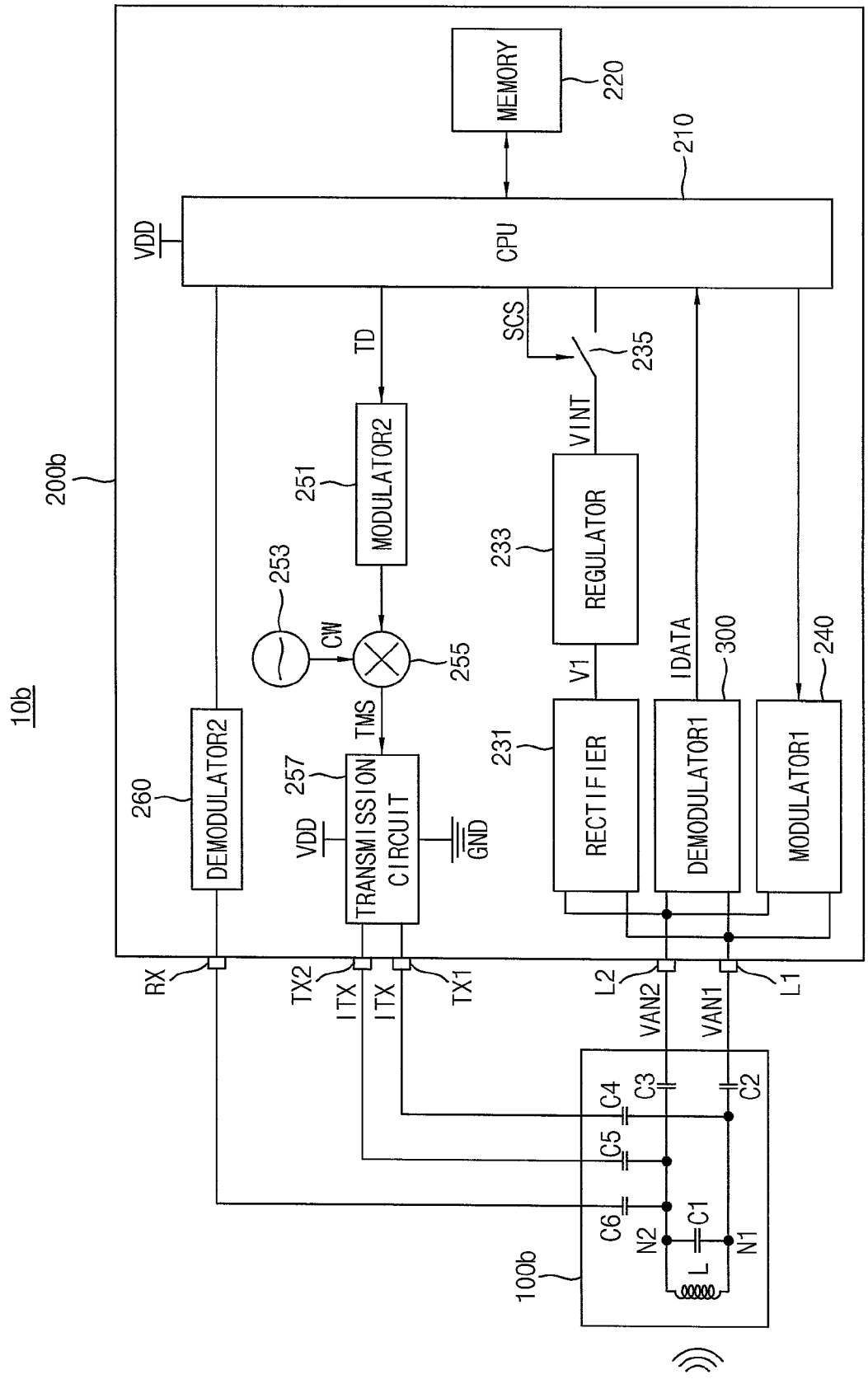
FIG. 13 is a block diagram illustrating an example of an NFC device of FIG. 1.

FIG. 13 is a block diagram illustrating an example of an NFC device of FIG. 1.

Referring to FIG. 13, an NFC device 10b includes a resonance circuit 100b and an NFC chip 200b.

The NFC chip 200b may be connected to the resonance circuit 100b through a first power terminal L1, a second power terminal L2, a first transmission terminal TX1, a second transmission terminal TX2 and a reception terminal RX.

The resonance circuit 100b includes an antenna L, a first capacitor C1, a second capacitor C2, a third capacitor C3, a fourth capacitor C4, a fifth capacitor C5 and a sixth capacitor C6.

The antenna L and the first capacitor C1 are connected in parallel between a first node N1 and a second node N2. The antenna L and the first capacitor C1 may have a resonance frequency. In some example embodiments, the resonance frequency of the antenna L and the first capacitor C1 may be about 13.56 MHz.

The second capacitor C2 is connected between the first node N1 and the first power terminal L1. The third capacitor C3 is connected between the second node N2 and the second power terminal L2.

The fourth capacitor C4 is connected between the first node N1 and the first transmission terminal TX1. The fifth capacitor C5 is connected between the second node N2 and the second transmission terminal TX2. The sixth capacitor C6 is connected between the second node N2 and the reception terminal RX.

The structure of the resonance circuit 100b illustrated in FIG. 13 is an example only and the structure of the resonance circuit 100b according to example embodiments may not be limited thereto, but may be variously modified.

The NFC chip 200b may perform a transmission operation and a reception operation through the first power terminal L1 and the second power terminal L2 in the card mode, perform a transmission operation through the first transmission terminal TX1 and the second transmission terminal TX2 in the reader mode, and perform a reception operation through the reception terminal RX in the reader mode.

The NFC chip 200b may provide an output current ITX to the resonance circuit 100b through the first transmission terminal TX1 and the second transmission terminal TX2, and receive the antenna voltage VAN from the resonance circuit 100b through the first power terminal L1 and the second power terminal L2.

The NFC chip 200b includes a rectifier 231, a regulator 233, a power switch 235, a first demodulator 300, a first modulator 240, a central processing unit (CPU) 210, a memory 220, a second demodulator 260, a second modulator 251, an oscillator 253, a mixer 255 and a transmission circuit 257.

The rectifier 231 may generate a first voltage V1, which is a direct voltage, by rectifying the first antenna voltage VAN1 and the second antenna voltage VAN2 provided from the resonance circuit 100b through the first power terminal L1 and the second power terminal L2. The regulator 233 may generate an internal voltage VINT, which has a voltage level of a predetermined magnitude usable in the NFC chip 200b, using the first voltage V1.

The CPU 210 may control the overall operation of the NFC chip 200b. The CPU 210 may operate using a supply voltage VDD provided from a power source, such as a battery. In addition, the CPU 210 may receive the internal voltage VINT from the regulator 233 through the power switch 235. When the supply voltage VDD is equal to or higher than a predetermined voltage level, the CPU 210 may operate using the supply voltage VDD and disable a switch control signal SCS to turn off the power switch 235. When the supply voltage VDD is lower than the predetermined voltage level, the CPU 210 may enable the switch control signal SCS to turn on the power switch 235 such that the CPU 210 may operate using the internal voltage VINT provided from the regulator 233.

When the NFC chip 200b performs the reception operation in the card mode, the first demodulator 300 may generate an input data IDATA by demodulating the first antenna voltage VAN1 and the second antenna voltage VAN2 provided from the resonance circuit 100b through the first power terminal L1 and the second power terminal L2, and provide the input data IDATA to the CPU 210. The CPU 210 may store the input data IDATA in the memory 220.

The first demodulator 300 included in the NFC device 10b of FIG. 13 may be implemented with the demodulator 300 included in the NFC device 10a of FIG. 2. A structure and an operation of the demodulator 300 included in the NFC device 10a of FIG. 2 are described above with reference to FIGS. 1 to 12. Therefore, a detail description of the first demodulator 300 included in the NFC device 10b of FIG. 13 will be omitted.

When the NFC chip 200b performs the transmission operation in the card mode, the CPU 210 may read out an output data from the memory 220 to provide the output data to the first modulator 240 and the first modulator 240 may modulate the output data to provide a modulation signal to the first power terminal L1 and the second power terminal L2. For instance, the first modulator 240 may generate the modulation signal by performing a load modulation on the output data.

When the NFC chip 200b performs the reception operation in the reader mode, the second demodulator 260 may generate an input data by demodulating a signal provided from the resonance circuit 100b through the reception terminal RX to provide the input data to the CPU 210. The CPU 210 may store the input data in the memory 220.

When the NFC chip 200b performs the transmission operation in the reader mode, the CPU 210 may read out an output data TD from the memory 220 to provide the output data TD to the second modulator 251, the second modulator 251 may modulate the output data TD to generate a modulation signal, the oscillator 253 may generate a carrier signal CW having a carrier frequency (e.g., 13.56 MHz), and the mixer 255 may generate a transmission modulation signal TMS by synthesizing the carrier signal CW with the modulation signal.

The transmission circuit 257 is connected between the supply voltage VDD and the ground voltage GND.

In the reader mode, the transmission circuit 257 may provide the output current ITX, which corresponds to the transmission modulation signal TMS received from the mixer 255, to the resonance circuit 100b through the first transmission terminal TX1 and the second transmission terminal TX2, and the resonance circuit 100b may emit the electromagnetic wave EMW having a magnitude corresponding to the output current ITX.

In some example embodiments, in the reader mode, the transmission circuit 257 may provide the output current ITX corresponding to the transmission modulation signal TMS to the resonance circuit 100b through the first transmission terminal TX1 and the second transmission terminal TX2 by connecting the first transmission terminal TX1 and the second transmission terminal TX2 to the supply voltage VDD through a pull-up load or to the ground voltage GND through a pull-down load based on the transmission modulation signal TMS.

For example, in the reader mode, the transmission circuit 257 may connect the first transmission terminal TX1 to the supply voltage VDD through the pull-up load and connect the second transmission terminal TX2 to the ground voltage GND through the pull-down load, or connect the first transmission terminal TX1 to the ground voltage GND through the pull-down load and connect the second transmission terminal TX2 to the supply voltage VDD through the pull-up load based on the transmission modulation signal TMS to provide the output current ITX corresponding to the transmission modulation signal TMS to the resonance circuit 100b through the first transmission terminal TX1 and the second transmission terminal TX2.

When the transmission circuit 257 connects the first transmission terminal TX1 to the supply voltage VDD through the pull-up load and connects the second transmission terminal TX2 to the ground voltage GND through the pull-down load, the output current ITX may be generated from the supply voltage VDD, be provided to the resonance circuit 100b through the first transmission terminal TX1 and be sunk to the ground voltage GND through the second transmission terminal TX2.

When the transmission circuit 257 connects the first transmission terminal TX1 to the ground voltage GND through the pull-down load and connects the second transmission terminal TX2 to the supply voltage VDD through the pull-up load, the output current ITX may be generated from the supply voltage VDD, be provided to the resonance circuit 100b through the second transmission terminal TX2 and be sunk to the ground voltage GND through the first transmission terminal TX1.

Figure 14:
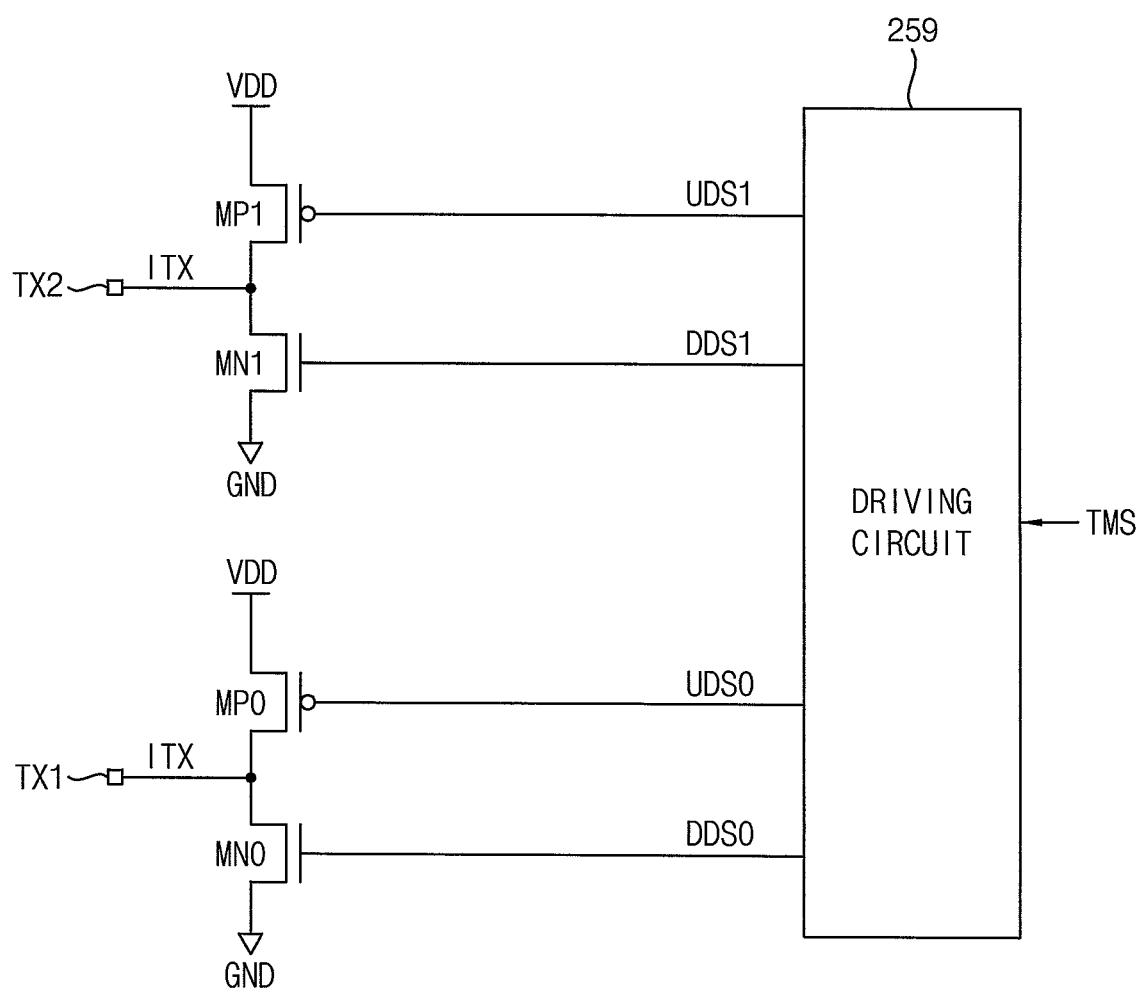
FIG. 14 is a block diagram illustrating an example of a transmission circuit included in an NFC device of FIG. 13.

FIG. 14 is a block diagram illustrating an example of a transmission circuit included in an NFC device of FIG. 13.

Referring to FIG. 14, the transmission circuit 257 includes a first pull-up transistor MP0, a second pull-up transistor MP1, a first pull-down transistor MN0, a second pull-down transistor MN1 and a driving circuit 259.

The first pull-up transistor MP0 and the second pull-up transistor MP1 may be PMOS transistors. The first pull-down transistor MN0 and the second pull-down transistor MN1 may be n-channel metal oxide semiconductor (NMOS) transistors.

The first pull-up transistor MP0 is connected between the supply voltage VDD and the first transmission terminal TX1, and the first pull-down transistor MN0 is connected between the first transmission terminal TX1 and the ground voltage GND.

The second pull-up transistor MP1 is connected between the supply voltage VDD and the second transmission terminal TX2, and the second pull-down transistor MN1 is connected between the second transmission terminal TX2 and the ground voltage GND.

The driving circuit 259 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving circuit 259 may turn on one of the first pull-up transistor MP0 and the first pull-down transistor MN0 and turn on one of the second pull-up transistor MP1 and the second pull-down transistor MN1 based on the transmission modulation signal TMS.

For example, the driving circuit 259 may turn on the first pull-up transistor MP0 and the second pull-down transistor MN1 and turn off the second pull-up transistor MP1 and the first pull-down transistor MN0, or turn on the second pull-up transistor MP1 and the first pull-down transistor MN0 and turn off the first pull-up transistor MP0 and the second pull-down transistor MN1 based on the transmission modulation signal TMS to provide the output current ITX corresponding to the transmission modulation signal TMS to the resonance circuit 100b through the first transmission terminal TX1 and the second transmission terminal TX2.

As described above with reference to FIGS. 13 and 14, since the NFC device 10b performs the reception operation using the first demodulator 300 in the card mode, the NFC device 10b may be able to receive data correctly even in the case that the first antenna voltage VAN1 and the second antenna voltage VAN2 generated by the resonance circuit 100b are relatively low. As such, a communication distance of the NFC device 10b may be effectively increased.

Figure 15:
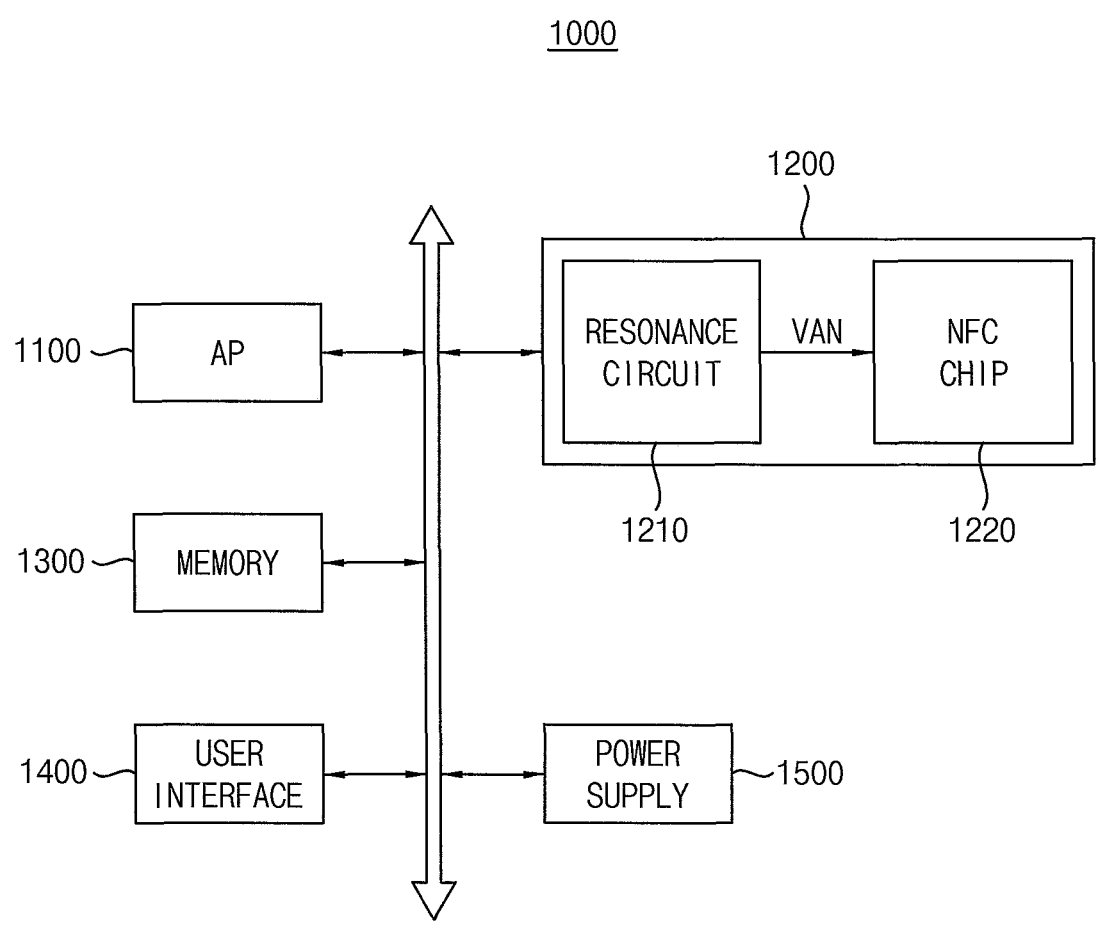
FIG. 15 is a block diagram illustrating an electronic device according to an example embodiment of the inventive concept.

FIG. 15 is a block diagram illustrating an electronic device according to an example embodiment.

Referring to FIG. 15, an electronic device 1000 includes an application processor AP 1100, an NFC device 1200, a memory device 1300, a user interface 1400 and a power supply 1500. In some example embodiments, the electronic device 1000 may be arbitrary mobile systems, such as a mobile phone, a smart phone, a personal digital assistant (PDA), a portable multimedia player (PMP), a digital camera, a camcorder, a music player, a portable game console, a navigation system, etc.

The application processor 1100 controls overall operations of the electronic device 1000. The application processor 1100 may execute applications, such as a web browser, a game application, a video player, etc. In some embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store output data to be transmitted to an external device and input data received from the external device. In some example embodiements, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The NFC device 1200 transmits the output data stored in the memory device 1300 to an external device through NFC.

The NFC device 1200 receives input data from the external device through NFC to store the input data in the memory device 1300.

The NFC device 1200 includes a resonance circuit 1210 and an NFC chip 1220. The resonance circuit 1210 may generate an antenna voltage VAN based on an electromagnetic wave EMW received from the external device. The NFC chip 1220 may include a demodulator that demodulates the antenna voltage VAN to generate the input data. The demodulator may receive the antenna voltage VAN from the resonance circuit 1210, selectively increase the DC level of antenna voltage VAN based the magnitude of the antenna voltage VAN, rectify the antenna voltage VAN to generate a rectified signal and generate the input data based on the rectified signal. Therefore, the demodulator receives data correctly even in the case that the antenna voltage VAN is relatively low.

The NFC device 1200 may be implemented with the NFC device 10 of FIG. 1. A structure and an operation of the NFC device 10 of FIG. 1 are described above with reference to FIGS. 1 to 14. Therefore, a detail description of the NFC device 1200 of FIG. 15 will be omitted.

The user interface 1400 may include at least one input device, such as a keypad, a touch screen, etc., and at least one output device, such as a speaker, a display device, etc. The power supply 1500 may supply a power supply voltage to the electronic device 1000.

In some embodiments, the electronic device 1000 may further include an image processor, and/or a storage device, such as a memory card, a solid state drive (SSD), a hard disk drive (HDD), a CD-ROM, etc.

In some embodiments, the electronic device 1000 and/or components of the electronic device 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Example embodiments may be applicable to any kind of electronic device that employs an NFC device.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A demodulator for a near field communication (NFC), the demodulator comprising:
   a first rectifier configured to receive an antenna voltage through a first power terminal and a second power terminal, configured to rectify the antenna voltage and configured to provide a first rectified signal to a first node;
   a shifting rectifier configured to be enabled in response to an enable signal, configured to receive the antenna voltage through the first power terminal and the second power terminal, configured to increase a direct current (DC) level of the antenna voltage, configured to rectify the increased DC-level antenna voltage and configured to provide a shifted rectified signal to the first node;
   a field monitor configured to receive the antenna voltage through the first power terminal and the second power terminal, configured to monitor a magnitude of the antenna voltage and configured to generate the enable signal which is enabled when the magnitude is smaller than a reference value; and
   an edge detector configured to generate input data corresponding to the antenna voltage based on at least one of the first rectified signal and the shifted rectified signal at the first node.

2. The demodulator of claim 1, wherein
   the antenna voltage includes a first antenna voltage and a second antenna voltage which have same magnitude and a phase difference of 180 degrees,
   the first antenna voltage is received from outside through the first power terminal, and
   the second antenna voltage is received from the outside through the second power terminal.

3. The demodulator of claim 2, wherein the first rectifier comprises:
   a first diode connected between the first power terminal and the first node; and
   a second diode connected between the second power terminal and the first node.

4. The demodulator of claim 3, wherein a threshold voltage of the first diode is substantially the same as a threshold voltage of the second diode.

5. The demodulator of claim 2, wherein the shifting rectifier comprises:
   a first diode connected to the first node;
   a first source follower, connected between the first power terminal and the first node, configured to increase a DC level of the first antenna voltage;
   a second diode connected to the first diode; and
   a second source follower, connected between the second power terminal and the first node, configured to increase a DC level of the second antenna voltage.

6. The demodulator of claim 5, wherein the first source follower comprises:
   a first current source connected between an internal power supply voltage and a second node connected to the first diode; and
   a first p-channel metal-oxide semiconductor (PMOS) transistor connected between the second node and a ground voltage, the first PMOS transistor having a gate that receives the first antenna voltage, and
   wherein the second source follower comprises:
   a second current source connected between the internal power supply voltage and a third node connected to the second diode; and
   a second PMOS transistor connected between the third node and the ground voltage, the second PMOS transistor having a gate that receives the second antenna voltage.

7. The demodulator of claim 6, wherein,
a threshold voltage of the first PMOS transistor is substantially the same as a threshold voltage of the second PMOS transistor,
the first source follower is configured to increase the DC level of the first antenna voltage substantially by the threshold voltage of the first PMOS transistor, and
the second source follower is configured to increase the DC level of the second antenna voltage substantially by the threshold voltage of the second PMOS transistor.

8. The demodulator of claim 2, wherein the field monitor comprises:
a second rectifier configured to receive the antenna voltage from the first power terminal and the second power terminal, configured to rectify the antenna voltage and configured to provide a second rectified signal to a second node; and
a signal generator configured to convert the second rectified signal to a corresponding first digital signal, configured to compare the first digital signal with the reference value and configured to selectively activate the enable signal based on the comparison of the first digital signal and the reference value.

9. The demodulator of claim 8, wherein the signal generator comprises:
an analog-to-digital converter configured to convert the second rectified signal to the first digital signal; and
a decision circuit configured to store a second digital signal corresponding to the reference value therein, configured to compare the first digital signal with the second digital signal and configured to selectively activate the enable signal.

10. The demodulator of claim 8, wherein the second rectifier comprises:
a first diode connected between the first power terminal and the second node; and
a second diode coupled between the second power terminal and the second node.

11. The demodulator of claim 8, wherein the field monitor further comprises:
an attenuator connected between the second rectifier and the signal generator, and wherein the attenuator is configured to scale-down a magnitude of the second rectified signal to provide a third rectified signal to the signal generator.

12. The demodulator of claim 8, wherein
the field monitor is configured to deactivate the enable signal when the magnitude of the antenna voltage is equal to or greater than the reference value and the shifting rectifier is disabled in response to the deactivation of the enable signal, and
the field monitor is configured to activate the enable signal when the magnitude of the antenna voltage is smaller the reference value and the shifting rectifier is enabled in response to the activation of the enable signal and provides the shifted rectified signal to the first node.

13. The demodulator of claim 1, further comprising:
a current source, connected between the first node and a ground voltage, to generate a constant current flowing from the first node to the ground voltage; and
a charge storing circuit, connected between the first node and the ground voltage, configured to perform a charging operation and a discharging operation alternately, based on the signal at the first node, and configured to output an envelope signal, which corresponds to an envelope of the scale down signal, through the first node,
wherein the edge detector is configured to generate the input data based on a transition of the envelope signal.

14. A near field communication (NFC) device, comprising:
a resonance circuit configured to generate an antenna voltage based on an electromagnetic wave received from an external device; and
an NFC chip configured to communicate data with the external device based on the antenna voltage,
wherein the NFC chip includes a demodulator configured to receive the antenna voltage from the resonance circuit, configured to perform one of a first rectifying operation to directly rectify the antenna voltage and a second rectifying operation to rectify an increased DC-level antenna voltage after increasing the DC-level of the antenna voltage based on a magnitude of the antenna voltage, configured to provide a rectified signal to a first node, and configured to generate input data corresponding to the antenna voltage based on the rectified signal at the first node.

15. The NFC device of claim 14, wherein the demodulator is configured to perform the first rectifying operation when the magnitude of the antenna voltage is equal to or greater than a reference value.

16. The NFC device of claim 14, wherein the demodulator is configured to perform the second rectifying operation when the magnitude of the antenna voltage is smaller than a reference value.

17. The NFC device of claim 14, wherein,
the antenna voltage includes a first antenna voltage and a second antenna voltage which have a same magnitude and a phase difference of 180 degrees,
the demodulator receives the first antenna voltage from the resonance circuit through a first power terminal, and
the demodulator receives the second antenna voltage from the resonance circuit through a second power terminal.

18. The NFC device of claim 17, wherein the demodulator comprises:
a first rectifier configured to receive the antenna voltage from the first power terminal and the second power terminal, configured to rectify the antenna voltage and configured to provide a first rectified signal to the first node;
a shifting rectifier configured to be activated in response to an enable signal, configured to receive the antenna voltage from the first power terminal and the second power terminal, configured to increase the DC level of the antenna voltage, configured to rectify the increased DC-level antenna voltage and configured to provide a shifted and rectified signal to the first node;
a field monitor configured to receive the antenna voltage from the first power terminal and the second power terminal, configured to monitor a magnitude of the antenna voltage and configured to generate the enable signal which is enabled when the magnitude is smaller than a reference value; and
an edge detector configured to generate the input data based on the signal at the first node.

19. An electronic device, comprising:
a near field communication (NFC) device configured to communicate with an external device through NFC;
a memory device configured to store input data; and an application processor configured to control operations of the NFC device and the memory device, wherein the NFC device includes:

a resonance circuit configured to generate an antenna voltage based on an electromagnetic wave received from the external device; and an NFC chip configured to communicate data with the external device based on the antenna voltage, wherein the NFC chip includes a demodulator configured to receive the antenna voltage from the resonance circuit, configured to perform one of a first rectifying operation to directly rectify the antenna voltage and a second rectifying operation to rectify an increased DC-level antenna voltage after increasing the DC-level of the antenna voltage based on a magnitude of the antenna voltage, configured to provide a rectified signal to a first node, and configured to generate input data corresponding to the antenna voltage based on the rectified signal at the first node.

20. The electronic device of claim 19, wherein the resonance circuit comprises:

an antenna connected between a second node and a third node;

a first capacitor connected between the second node and the third node in parallel with the antenna;

a second capacitor connected between the second node and the first power terminal; and a third capacitor connected between the third node and the second power terminal.

* * * * *